United States Patent [19]

Kumm

[11] Patent Number: 4,824,419
[45] Date of Patent: Apr. 25, 1989

[54] FLAT BELT CONTINUOUSLY VARIABLE TRANSMISSION WITH GEARED SPEED RATIO CONTROL SYSTEM

[75] Inventor: Emerson L. Kumm, Tempe, Ariz.

[73] Assignee: Kumm Industries, Inc., Phoenix, Ariz.

[21] Appl. No.: 215,417

[22] Filed: Jul. 5, 1988

[51] Int. Cl.$^4$ .................... F16H 9/10; F16H 55/54
[52] U.S. Cl. ........................... 474/49; 474/52; 474/56
[58] Field of Search .................. 474/49–57; 74/751, 752 R, 752 B, 752 F, 750 R

[56] References Cited

U.S. PATENT DOCUMENTS

| | | | |
|---|---|---|---|
| 769,117 | 8/1904 | Shue | 474/56 |
| 783,310 | 2/1905 | Reed | 474/56 X |
| 4,068,539 | 1/1978 | Nyc | 474/56 X |
| 4,591,351 | 5/1986 | Kumm | 474/49 |
| 4,714,452 | 12/1987 | Kumm et al. | 474/53 X |

Primary Examiner—Thuy M. Bui
Attorney, Agent, or Firm—Charles E. Cates; James H. Phillips

[57] ABSTRACT

A flat belt CVT is disclosed in which a geared control system is employed to establish and maintain the effective diameter of each pulley assembly by determining the mutual angular relationship between sets of inner and outer guideway disks provided with spirals oriented in the opposite sense and supporting belt engaging elements at their intersections. The sets of guideway disks are coupled through a planetary gear system which includes a component which can be externally manipulated to adjust the angular relationship between the sets of inner and outer guideway disks while rotating. The planetary gear system includes a first sun gear which meshes with star gears whose shafts are fixed in position with respect to the first sun gear. A second sun gear meshes with planet gears which may orbit around the second sun gear while rotating on a planet carrier. The star and planet gears each mesh with the same internal ring gear, and an external ring gear on the planet carrier meshes with a pinion which is coupled to an external positioning structure such as a hand crank for the driving pulley assembly and a load device for the driven pulley assembly. In one embodiment especially suitable for certain applications, a harmonic drive is interposed between one of the sun gears and the set of guideway disks to which it is coupled to increase precision and reduce torque and power requirements.

15 Claims, 5 Drawing Sheets

FLAT BELT CONTINUOUSLY VARIABLE TRANSMISSION WITH GEARED SPEED RATIO CONTROL SYSTEM

FIELD OF THE INVENTION

This invention relates to the continuously variable transmission (CVT) art and, more particularly, to a flat belt CVT incorporating a geared speed ratio control system.

BACKGROUND OF THE INVENTION

Continuously variable transmissions of the class which may be broadly characterized as that wherein a belt couples a pair of pulleys, each of which can assume a more or less continuous range of effective diameters, generally fall into two categories; viz.: (a) those systems employing V-belts or variations thereof (such as link belts or chains) for transmitting power from one pulley to the other and (b) those systems employing flat, flexible belts between the variable diameter pulleys.

Those skilled in the art have come to appreciate that CVT's employing flat, flexible belts enjoy significant fundamental advantages over those systems employing V-belts. In the case of the latter, the belts are composed of various compositions and have a trapezoidal cross section, the belt transmitting rotary motion at one speed from a source of power (such as an engine or motor) to an output shaft at another speed, the speed ratio being varied in a continuous fashion from a minimum to a maximum as dependent on the geometry of the belt and the pulley system. The V-belt is compressed between smooth, conical sheave sections in each of the two pulleys by external axial forces acting on the sections to apply compression to the belt giving friction between the sides of the belt in the sheave sections to prevent slippage. In operation, a force unbalance caused by changes in the axial loading of the sheave sections causes the V-belt to change its radial positions in the two pulleys until a force balance is achieved or a limit range stop is reached.

For a large transmitted torque, the required axial forces exerted on the sheaves result in large compressive forces on the V-belt which requires that the belt have a substantial thickness to prevent its axial collapse or failure. This increase in thickness increases the belt's centrifugal force and causes higher belt tension load. In addition, as the belt thickness increases, the pulley size must be increased due to higher stress loads at a given design minimum pulley radius. Further, the typical V-belt must continuously "pull out" from the compressive sheave load on leaving each pulley which results in significant friction losses and belt fatigue which adversely affects the overall efficiency of the system and the operating life of the belt. Consequently, although variable speed pulley drives have successfully used V-belts in a wide range of applications, they have been severely limited in their power capabilities for more competitive smaller size equipment.

As a result of these inherent drawbacks to the use of V-belts in continuously variable transmissions, a second category has developed which may broadly be designated as flat belt drive continuously variable transmissions. As the name suggests, flat belts are employed between driven and driving pulley assemblies which are dynamically individually variable in diameter to obtain the sought-after ratio changes. No axial movement between the two pulley rims is necessary. On the other hand, it is necessary to somehow effect the diametric variations of the individual pulley assemblies, and in one particularly effective system, this function is achieved by causing a circular array of drive elements in each pulley to translate radially inwardly or outwardly in concert as may be appropriate to obtain a given effective diameter of the pulley assembly. Variable speed flat belt transmissions of this particular type, and their associated control systems, are disclosed in U.S. Pat. Nos. 4,024,772; 4,295,836; 4,591,351 and 4,714,452 as well as United States patent applications Ser. No. 051,922, filed May 19, 1987, and now U.S. Pat. No. 4,765,996; and Ser. No. 132,783, filed Dec. 14, 1987, all issued to Emerson L. Kumm. In all but the first patent enumerated above, the subject variable diameter pulley components have included a pair of pulley sheaves between which there extends a series of belt engaging elements that are simultaneously moved both radially and circumferentially. In one exemplary construction, there is a series of twenty-four belt engaging elements such that an angle of fifteen degrees extends between runs of the belt coming off tangentially from one belt engaging element compared to that of an immediately adjacent belt engaging element.

Each pulley assembly includes two sets of two disks (designated, respectively, the inner guideway disk and the outer guideway disk in each pair) which are parallel to each other with the inner and outer guideway disks of each set being disposed immediately adjacent one another. Each of the guideway disks of an adjacent pair has a series of spiral grooves or guideways with the guideways of the pair oriented in the opposite sense such that the ends of the belt engaging elements are captured at the intersections of the spiral guideways. Thus, radial adjustment of the belt engaging elements may be achieved by bringing about transient relative rotation between the inner and outer guideway disks to change their angular relationship, this operation being, of course, carried out simultaneously and in coordination at both sets of guideway disks of a pulley assembly.

The disclosure of the above-identified patents and patent applications to Emerson L. Kumm include control systems for effectively establishing the mutual angular relationships between the inner and outer guideway disks of each pulley assembly in a CVT employed, for example, in a straightforward vehicular automatic transmission application. Those skilled in the art will appreciate that extremely precise adjustment of the speed ratio between the pulley assemblies is not required in such an environment and is not achieved by the prior art control systems. Similarly, manual adjustment to a precise speed ratio is neither required nor obtained.

However, there are other vehicular and non-vehicular applications for CVT's in which it is very desirable to obtain a very precise adjustment to the speed ratio. For example, in the so-called geared neutral configuration for a vehicle automatic transmission, it is necessary that, under certain conditions, the speed ratio be established and maintained at a precise value or regenerative torque buildup in the transmission can cause the failure of gears, etc. As another example, there are non-vehicular CVT applications, such as in driving precision machine tools, in which it is advantageous to have the facility for manually "cranking in" and thereafter closely maintaining a narrowly defined speed ratio. The prior art control systems for flat belt CVT's, however, have simply not been able to achieve and/or maintain the speed ratio to the precision required for these applications such that the use of a flat belt CVT in such applications has been heretofore precluded. My invention is directed to achieving very close control of the speed ratio in a flat belt CVT.

OBJECTS OF THE INVENTION

Consequently, it is a broad object of my invention to provide an improved flat belt continuously variable transmission.

It is another object of my invention to provide, in such a continuosly variable transmission, a geared control system for very precisely establishing and maintaining the speed ratio between driving and driven pulley assemblies. It is a further object of my invention to provide such a geared control system which is readily adaptable to either manual or automatic operation.

It is a still further object of my invention to provide such a system which is relatively compact, lightweight, simple and inexpensive.

SUMMARY OF THE INVENTION

Briefly, these and other objects of my invention are achieved by a geared control system employed in a flat belt CVT of the type in which the effective diameter of each pulley assembly is determined by the mutual angular relationship between sets of inner and outer guideway disks having logarithmic spirals which are oriented in the opposite sense and support belt engaging elements at their intersections. The sets of inner and outer guideway disks are coupled through a planetary gear system which includes a component which can be externally manipulated to adjust the angular relationship between the sets of inner and outer guideway disks. More particularly, the sets of inner and outer guideway disks are coupled to axially aligned sun gears. A first one of the sun gears is surrounded by and meshes with a plurality of star gears whose shafts are fixed in position with respect to the shaft of the first sun gear. A second one of the sun gears is surrounded by and meshes with a plurality of planet gears which may orbit around the second sun gear by virtue of their support on a rotatable planet carrier. The star gears and planet gears each mesh with the same internal ring gear, and an external ring gear on the planet carrier meshes with a speed control pinion which is coupled to externally manipulable structure. For the driving pulley assembly, the externally manipulable structure may be a hand crank, motor, generator, pump or other appropriate device for a given environment. For the driven pulley assembly, the externally manipulable structure may be a load device, such as a hydraulic motor/pump or an electrical motor/generator which can either absorb or deliver rotational energy. Thus, turning the handcrank causes a change in the angular relationship between the first and second sun gears and, consequently, between the sets of inner and outer guideway disks of the driving pulley assembly to alter the effective diameter of the driving pulley assembly. The driven pulley assembly simultaneously undergoes an effective diameter change in the opposite direction because of the fixed length of the flat belt coupling the pulley assemblies and the fixed separation between their axes. In one embodiment especially suitable for critical applications, the degree of fineness with which the speed ratio between the driving and driven pulley assemblies may be established and maintained is further enhanced by the interposition of a gear reduction device between one of the sun gears and the set of guideway disks to which it is coupled. A particularly well adapted gear reduction device for performing this function is a harmonic drive. Also, the use of the harmonic drive permits the torque and power requirements of the external control to be greatly reduced.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
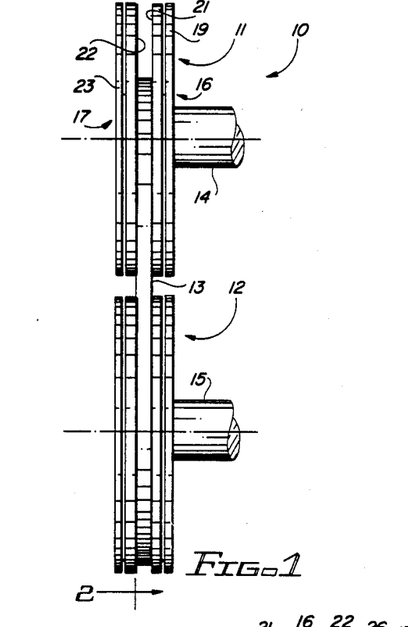
FIG. 1 illustrates an edge on view of driving and driven pulley assemblies coupled by a flat belt and representative of the class of continuously variable transmissions in which the present invention finds application.
Figure 2:
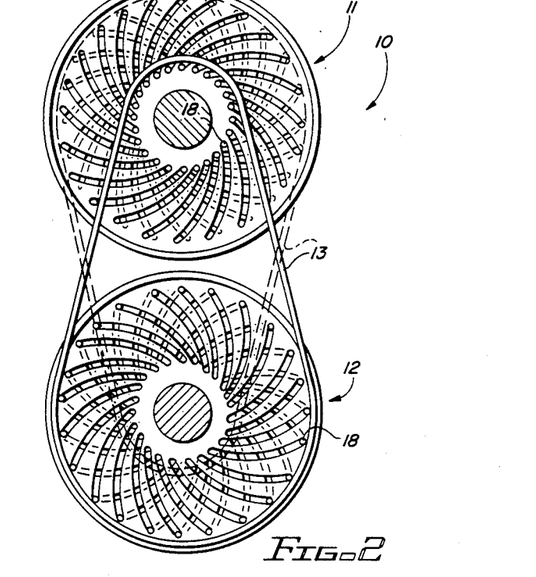
FIG. 2 is a cross sectional view, taken along the lines 2—2 of FIG. 1, of the pulley assembly system illustrated in FIG. 1.
Figure 3:
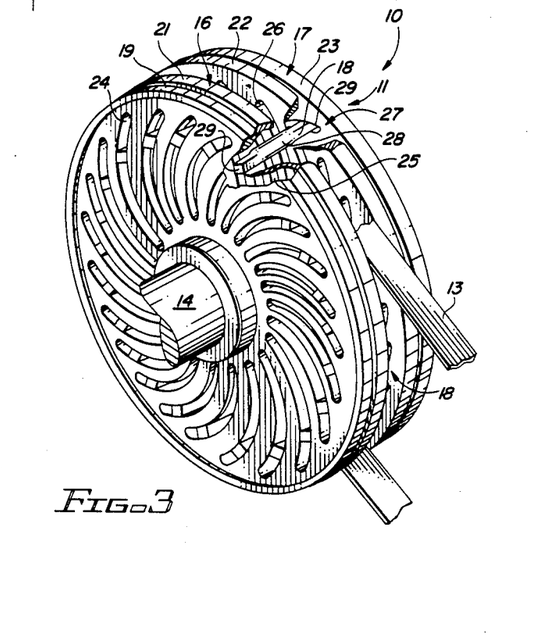
FIG. 3 is a fragmentary perspective view, partially broken away, of a pulley assembly particularly illustrating the relationships between inner and outer guideway disk components and belt engaging element components.

Referring now to FIGS. 1, 2 and 3, fundamental aspects of the flat belt type of continuously variable transmission (with which the subject speed ratio control system is employed) are illustrated as embodied in a variable diameter pulley drive system 10 including variable diameter pulley assemblies 11 and 12 connected by a flat drive belt 13. The pulley assembly 11 will be considered as the driving pulley assembly and the pulley assembly 12 as the driven pulley assembly in this discussion, but it will be understood that the roles of these pulley assemblies may be reversed without altering the concepts involved.

The pulley assembly 11 is appropriately mounted on a shaft 14, and the pulley assembly 12 is similarly appropriately mounted on a shaft 15 as is well understood in the art. The pulley assemblies 11 and 12 are similar to each other, and only one of them, namely pulley assembly 11, will be specifically described in this discussion. The belt 13 as shown in FIG. 3 corresponds to the position of the belt 13 of FIG. 2 in the dashed line position.

The pulley assembly 11 includes a pair of pulley sheaves 16 and 17 between which there extends a series of belt engaging elements 18, the latter being engaged by the belt 13 for driving, or driven, conditions as will be understood. In one construction, there is a series of twenty-four belt engaging elements 18 equally circumferentially distributed whereby an angle of fifteen degrees is established between runs of the belt 13 coming off tangentially from one belt engaging element 18 as compared to that of an immediately adjacent belt engaging element 18. Each belt engaging element 18 includes a central shank 28, which engages the belt 13, and bearing regions 29 at each end.

The pulley sheave 16 incorporates a pair of pulley guideway disks 19 and 21 which are parallel to and lie immediately adjacent each other in juxtaposition. Similarly the pulley sheave 17 comprises a pair of pulley guideway disks 22 and 23 which are parallel to and lie immediately adjacent each other in juxtaposition. The longitudinal spacing between the pulley sheaves 16 and 17 (i.e., the axial spacing between the inner guideway disks 21 and 22) remains the same irrespective of the radial adjustment of the belt 13 for different driving or driven speeds. This spacing is sufficient to accommodate with clearance the belt drive element which supports the belt 13 which is selected to carry the load that the system is designed for as is well understood.

The range of radial adjustment or position of the belt 13 on the pulley assembly 11, as may be envisioned by the solid line and dashed line positions of belt 13 in FIG. 2, is achieved by altering the radial positions of the belt engaging elements 18. For example, in FIG. 2 the belt engaging elements 18 are close to the center of the shaft 14 in the solid line position of the belt 13 on pulley assembly 11; conversely, the belt engaging elements are radially farther out, namely adjacent the periphery, when the belt 13 is in its dashed line position which is also the position shown in FIG. 3.

Variations in the radial positions of the belt engaging elements 18 is achieved by relative rotation of the outer guideway disk 19 and the inner guideway disk 21 of pulley sheave 16 to change their angular relationship. Similarly, by identical relative rotation of the guideway disks 23, 22, respectively, of pulley sheave 17 change of angular relationship is accomplished. As a practical matter, to insure synchronous operation, the inner guideway disks 21 and 22 are physically locked together, and the outer guideway disks 19 and 23 are also locked together. Power for such operation, not shown in FIGS. 1, 2 or 3, has been achieved in the prior art typically as disclosed in U.S. Pat. No. 4,295,836 previously referenced. Particularly effective systems for controlling the phase angles between the inner and outer guideway disks are disclosed in the above-referenced United States patent applications Ser. No. 051,922, filed May 19, 1987, and now U.S. Pat. No. 4,765,996 and Ser. No. 132,783, filed Dec. 14, 1987. However, as previously noted, the prior art control systems are limited in the precision with which they can establish and/or maintain the speed ratio, and important applications for flat belt CVT's require greater precision than can be obtained with the prior art control systems.

The outer guideway disk 19 has a series of logarithmic spiral guideways 24 therein which progress outwardly from adjacent the center at an angle of forty-five degrees with respect to the pulley assembly radius. Similarly the inner guideway disk 21 has a series of logarithmic spiral guideways 25 radiating outwardly at an angle of forty-five degrees with respect to the pulley assembly radius, but in the opposite sense to the guideways 24 of guideway disk 19. Since the guideways 24 and 25 radiate outwardly at angles of forty-five degrees with respect to the pulley radius, but in opposite senses, the intersections of these guideways exist at ninety degrees at all radial positions. This results in a substantially constant geometry at the intersections of the logarithmic spiral guideways 24 and 25 at all radial positions for receiving the bearing region ends 29 of the belt engaging elements 18. Similarly, the inner guideway disk 22 has a series of logarithmic spiral guideways 26 radiating outwardly identically to the guideways 25 of inner guideway disk 21, and the outer guideway disk 23 includes logarithmic spiral guideways 27 extending outwardly identically to the guideways 24 of outer guideway disk 19. Hence, the guideways 26 and 27 intersect at ninety degrees at all radial positions to give a constant intersection geometry identical to the logarithmic spiral guideways 24 and 25 for receiving the other ends of the belt engaging elements 18.

While forty-five degree spirals have been shown and give ninety degree intersections, it will be understood that logarithmic spirals of other angularities may be used as desired. Also, minor variations from a particular angularity may be tolerated so long as the belt engaging element bearing ends supported at the guideway intersections will move appropriately when the sheaves are rotated relative to each other to change the angular relationship between the inner and outer guideway disks.

It will be clear that the belt 13, as it passes around the pulley assembly 11 or 12, engages the central shank portion of the belt engaging elements 18 and causes one pulley assembly to drive and the other pulley assembly to be driven in the obvious fashion.

The foregoing description of the basic drive system including the pulley assemblies 11 and 12, the belt 13 and the belt engaging elements 18 is set forth in greater detail in U.S. Pat. No. 4,295,836, dated Oct. 20, 1981, previously referred to and does not form a specific part of the invention described in this application, but forms the environment in which the invention functions.

Figure 4:
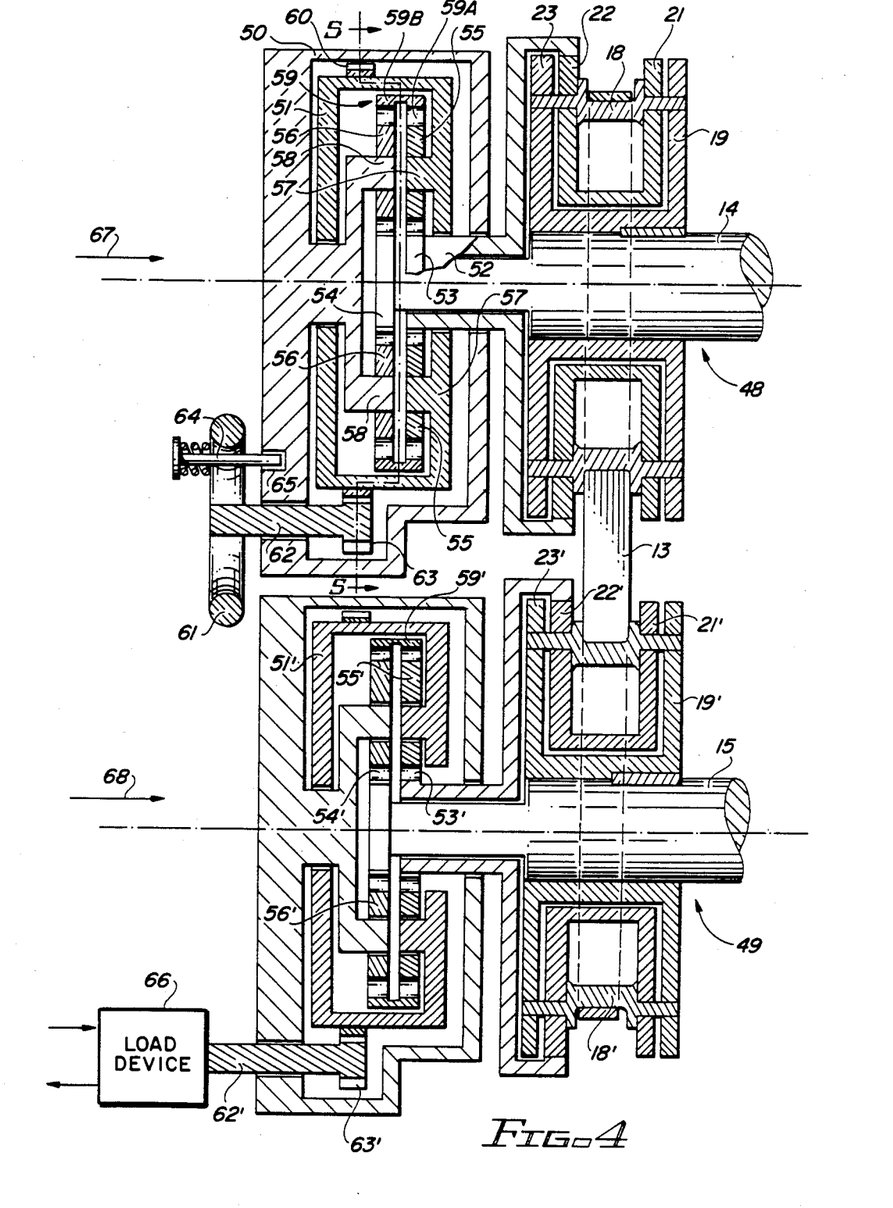
FIG. 4 is a simplified cross sectional view of a flat belt continuously variable transmission illustrating the fundamental aspects of the mechanical components of the subject control system for establishing the angular relationship between the inner and outer guideway disks of each pulley.
Figure 5:
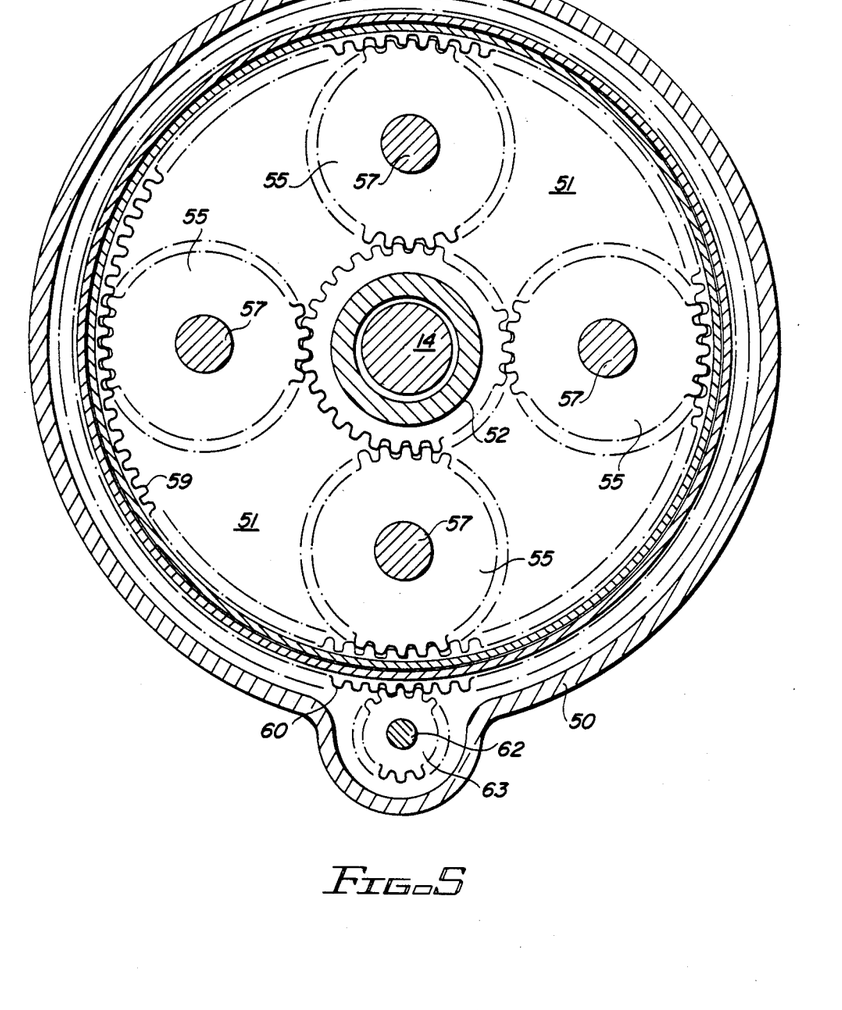
FIG. 5 is a cross sectional view taken along the lines 5—5 of FIG. 4 particularly illustrating a planetary gear assembly component of the control system.

Attention is now directed to FIGS. 4 and 5 illustrating a first embodiment of a CVT which, according to the present invention, incorporates a geared system for precisely establishing the speed ratio between a first pulley assembly 48 and a second pulley assembly 49. The geared speed ratio control mechanism associated with the upper pulley assembly 48 and that associated with the lower pulley assembly 49 are essentially identical with minor exceptions to be particularly noted in the following discussion. For that reason, the essential description will be set forth in conjunction with the upper pulley assembly 48 in FIG. 4 which, for purposes of illustration, may be deemed the driving pulley assembly whereas the lower pulley assembly 49 is considered the driven pulley assembly.

In each case, the geared speed ratio control mechanism, which serves to establish the angular relationship between the inner and outer guideway disks (and hence the radial positions of the belt engaging elements 18), is contained in a stationary housing 50. A reduced diameter region of the shaft 14 extends into the housing 50 and terminates in an outer sun gear 54. The set of inner guideway disks 21, 22 are directly connected to an hollow shaft 52 which encompasses the end region of the shaft 14 for mutual rotation therewith, and the hollow shaft 52 terminates in an inner sun gear 53. As shown in FIG. 4, the sun gears 53, 54 have the same diameter and the same tooth count which is necessary for a stationary control at specific speed ratios; however, this relationship is not a design constraint of the system which could employ continuously rotating control components. Nonetheless, in the presently preferred embodiments of the invention, the sun gears 53, 54 are identically configured for simplicity.

A planet carrier 51 is disposed for rotation within the stationary housing 50 about the axis of the shaft 14 and carries a plurality of planet gears 55, each supported for rotation on an individual planet gear shaft 57 as shown in FIGS. 4 and 5. Each of the planet gears 55 meshes, at its radially inner (with respect to the axis of the shaft 14) peripheral region, with the inner sun gear 53 and at its radially outer peripheral region with a first set of teeth 59A of an internal ring gear 59. The internal ring gear 59 also carries a second set of internal teeth 59B axially offset from the teeth meshing with the planet gears 55. For a stationary control at specific speed rations, the teeth of the second set 59B are typically identical to the teeth of the first set 59A.

Similarly, a plurality of star gears 56 are supported in fixed positions by star gear shafts 58 which are integral with the stationary housing 50. The star gears 56 are situated to mesh with both the second set of internal teeth 59B of the internal ring gear 59 and the teeth of the outer sun gear 54 which is directly connected to the shaft 14. The planet gears 55 and the star gears 56 are shown in FIG. 4 in face to face juxtaposition; however, this is only for simplicity of illustration, and it will become apparent below that the angular positions of the planet gears 55, relative to the star gears 56, about the axis of the shaft 14 are changed during operation of the control system.

The planet carrier 51 is provided with an external ring gear 60 with which there is meshed a spur pinion 63. The pinion 63 is manually driven by a speed control crank 61 via a shaft 62. The crank 61 may be constrained against rotation by permitting a crank retaining pin 64 to enter an aperture 65 provided in the stationary housing 50 for this purpose.

The lower pulley assembly 49 does not have a speed control crank, but rather is provided with a load device 66 which is connected by a shaft 62' to a spur pinion 63'. The load device 66 may take any form capable of absorbing and transmitting rotational force. For example, the load device 66 may be a hydraulic motor/pump and its corresponding control system as adapted from the oil motor/pump units described in the above-referenced United States patent applications Ser. No. 051,922 and U.S. Pat. No. 4,765,996. Another suitable load device is an electrical motor/generator as will be discussed below in conjunction with description of an alternate embodiment of the subject invention. A still simpler device for the purpose is a spiral torsion spring which generates a torque when wound in one direction and applied to rotate the planet carrier 51' relative to the housing 50', much in the manner of a clock spring.

Consider now the operation of the geared speed ratio control mechanism in the CVT illustrated in FIGS. 4 and 5. Assume first a static condition in which the speed ratio has been previously established and in which the speed control crank 61 is fixed in position by virtue of the retainer pin 64 extending into the aperture 65. Under these conditions, the sets of inner guideway disks 21, 22 and outer guideway disks 19, 23 are rotating at the same rate; consequently, the inner sun gear 53 and the outer sun gear 54 are also rotating at the same rate. Therefore, the planet gears 55 and star gears 56 will be rotating at the same rate and in the same direction. Also, the internal ring gear 59 is rotating within the stationary housing 50 in a direction opposite to that of the rotation of the shaft 14 and the hollow shaft 52. It will also be noted that the planet carrier 51 is not rotating under this steady state condition such that the angular relationship between the positions of the planet gears 55 and the star gears 56 about the axis of the shaft 14 remains fixed.

Now, the operation of the system when it is desired to change the speed ratio between the driving pulley assembly 48 and the driven pulley assembly 49 may be addressed. Since this adjustment only transiently involves changing the relationship among the stationary and moving components, its effect may best be understood by assuming that the shaft 14 is not rotating. Then, once the principles of operation are understood, the actual rotation of the shaft 14 may, in effect, be superimposed as a constant on the other movements of the mechanism.

Thus, temporarily assuming that the shaft 14 is stationary as noted, the speed control crank 61 may be rotated, for example, in the clockwise direction as viewed in the direction indicated by the reference arrow 67. As a result of such rotation of the crank 61, the planet carrier 51 will rotate, at a reduced rate (according to the gear ratio between the spur pinion 63 and the external ring gear 60) in the counter clockwise direction. Since the shaft 14 is deemed to be stationary and the housing 50 is immovable, the internal ring gear 59 is held stationary. Consequently, the movement of the planet gears 55 about the axis of the shaft 14 will drive the inner sun gear 53 in the counter clockwise direction to correspondingly drive the hollow shaft 52 and hence the set of inner guideway disks 21, 22 in the counter clockwise direction with respect to the set of outer guideway disks 19, 23 which are fixed to the shaft 14. As a result, the belt engaging elements 18 will move radially outwardly in unison (assuming the orientation of the longarithmic slots of the upper pulley assembly 48 corresponds to those of the driving pulley 11 illustrated in FIG. 2) to thereby increase the effective diameter of the driving pulley assembly 48. Once the desired incremental adjustment has been completed, the speed control crank 61 may again be fixed in place to maintain the new angular relationship between the planet gears 55 and star gears 56 to accordingly maintain the new pulley speed ratio. As previously noted, all this transient adjustment is simply superimposed on the actual rotation of the several components such that the adjustment to the relative angular positions of the set of inner guideway disks 21, 22 to the outer guideway disks 19, 23 actually takes place during pulley rotation and power transfer.

When the radial positions of the belt engaging elements 18 of the driving pulley assembly 48 move radially outwardly, the belt engaging elements 18' of the driven pulley assembly 49 must move radially inwardly since the belt 13 has a fixed length and the distance between the shafts 14 and 15 is fixed. Assuming for the moment that the driven shaft 15 is stationary, the set of outer guideway disks 19', 23', are also stationary. Therefore, the set of inner guideway disks 21', 22' must have moved counter clockwise as viewed from the direction indicated by the reference arrow 68. As the set of inner guideway disks 21', 22' moves counter clockwise, the inner sun gear 53' also rotates counter clockwise. Therefore, the planet gears 55' rotate clockwise. Since the driven shaft 15 is assumed to be stationary, the star gears 56' cannot rotate such that the internal ring gear 59' is also held stationary. Consequently, the action of the planet gears 55' enmeshed with the teeth of the internal ring gear 59' is such as to cause the planet carrier 51' to rotate counter clockwise. Therefore, the spur pinion 63' is rotated, at a multiplied rate, in the clockwise direction to drive the load device 66 in the clockwise direction via the shaft 62'.

This action takes place in synchronism with the adjustment to the relative positions of the planet gears 55 and star gears 56 of the driving pulley assembly 48; this action ceases a new steady state condition is assumed when the speed control crank 61 is again fixed in position. However, during the transient operation, the load device 66 will have functioned as such. For example, if the load device 66 is an oil motor/pump it will have functioned transiently as a pump. If the load device 66 is a motor/generator, it will have functioned transiently as a generator. If the load device is a spring, it will have been wound to some degree.

It will be readily apparent that if the speed control crank 61 is manually rotated in the counter clockwise direction, a string of effects opposite to those discussed above will ensue. Briefly, the planet carrier 51 will rotate in the clockwise direction causing the set of inner guideway disks 21, 22 to rotate in the clockwise direction to decrease the effective diameter of the driving pulley assembly 48. The belt engaging elements 18' of the driven pulley assembly 49 will therefore move radially outwardly, and will be assisted by virtue of the load device 66 operating in an energy delivering mode; i.e., as a hydraulic or electric motor or as an unwinding spring rotating in the clockwise direction.

The speed reducing gear arrangement between the pinion 63 and the external ring gear 60 acting in cooperation with the gear reduction afforded by the sun-/planet/star gear arrangement provides a substantial overall gear reduction to achieve the desired adjustment fineness for many CVT applications. However, in some applications, such as the previously mentioned geared neutral automatic transmission, it is necessary to obtain a degree of control which is not readily achieved through simply adjusting the gear ratios of the components in the system illustrated in FIG. 4. It is therefore useful to provide apparatus for greatly extending the degree of control which may be achieved by employing a geared control system according to the present invention.

Figures 6A, 6B, 6C, 8:
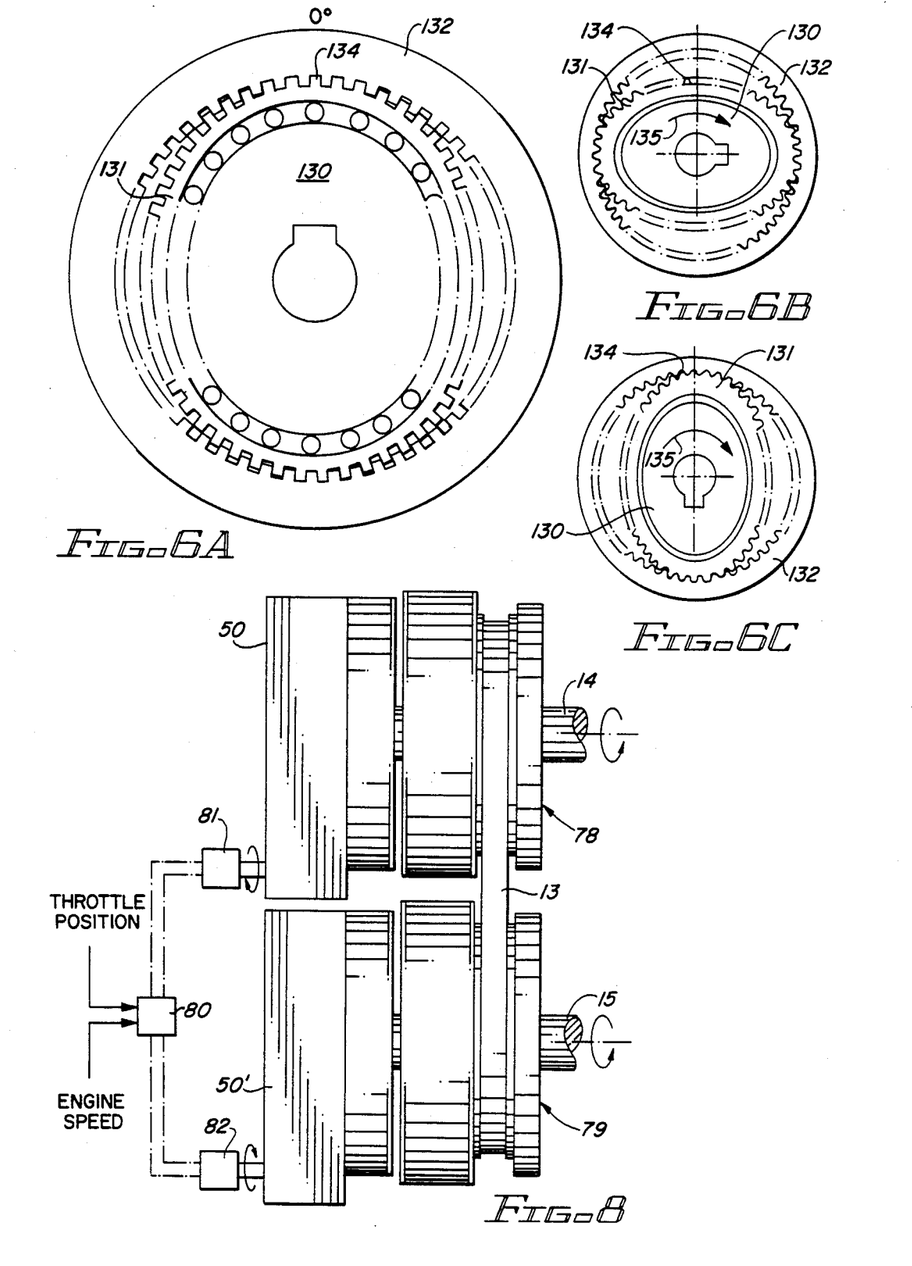
FIGS. 6A, 6B and 6C are illustrations showing the principle of operation of a harmonic drive, certain components being shown in an exaggerated elliptical shape in order to more clearly demonstrate the principle.
FIG. 8 is a simplified block diagram of an exemplary automatic version of the subject control system.

While it is possible to use many different differential gearing arrangements to obtain the desired fineness of operation for critical applications, the presently preferred critical application embodiment employs a so-called "harmonic" gear drive to provide the differential geared relationship. Referring to FIGS. 6A, 6B and 6C, and particularly to the somewhat enlarged FIG. 6A, the basic principles of a harmonic drive gear reduction apparatus are presented. In this most elementary form, a harmonic drive employs three concentric components to produce high mechanical advantage and speed reduction. The use of nonrigid body mechanics allows a continuous elliptical deflection wave to be induced in a nonrigid external gear, thereby providing a continuous rolling mesh with a rigid internal gear.

Thus, as shown in FIG. 6A, an elliptical wave generator 130 deflects a flexspline 131 which carries outside teeth and therefore meshes with the inside teeth of a rigid circular spline 132. The elliptical shape of the flexspline and the amount of flexspline deflection is shown greatly exaggerated in FIGS. 6A, 6B and 6C in order to demonstrate the principle. The actual deflection is very much smaller than shown and is well within the material fatigue limits.

Since the teeth on the non-rigid flexspline 131 and the rigid circular spline 132 are in continuous engagement and since the flexspline 131 typically has two teeth fewer than the circular spline 132, one revolution of the wave generator 130 causes relative motion between the flexspline and the circular spline equal to two teeth. Thus, with the circular spline 132 rotationally fixed, the flexspline 131 will rotate in the opposite direction to the wave generator (the system input in the example) at a reduction ratio equal to the number of teeth on the flexspline divided by two.

This relative motion may be visualized by examining the motion of a single flexspline tooth 134 over one-half of an input revolution in the direction shown by the arrow 135. Since the input to the wave generator 130, in the example, causes clockwise rotation of the wave generator, the flexspline rotates counterclockwise. Thus, referring to FIG. 6B, it will be seen that the tooth 134, after one-quarter revolution of the wave generator 130, has moved counter clockwise one-half of one flexspline tooth position. It will also be noted that when the wave generator 130 axis has rotated 90°, the tooth 134 is fully disengaged. Full reengagement occurs in the adjacent circular spline tooth space when the major axis of the wave generator 130 has rotated 180° as shown in FIG. 6C, and the tooth 134 has now advanced one full tooth position. This motion repeats as the major axis rotates another 180° back to zero, thereby producing the two tooth advancement per input revolution to the wave generator 130.

Conventional tabulations of harmonic drive gear reduction ratios assume the flexspline is the output member with the circular spline rotationally fixed. However, any of the drive elements may function as the input, output or fixed member depending upon whether the gearing is used for speed reduction, speed increasing or differential operation.

The harmonic drive principle can be extended by the addition of a fourth element designated the dynamic spline. The dynamic spline is an internal gear that rotates at the same speed and in the same direction as the flexspline. Unlike the circular spline (to which it is parallel, also engaging the flexspline), the dynamic spline has the same number of teeth as the flexspline. Flexspline shape rotation results in tooth engagement/disengagement within the same tooth space of the dynamic spline such that the ratio between the two is one to one. The system, therefore, is a flexspline output with the same characteristics as the three element harmonic drive model; i.e., gear reduction ratio tabulated with the direction of rotation opposite to the input. Ultra high dual ratio capability can be obtained by using two circular splines in mesh with the flexspline with each developing a different single-stage ratio. Merely by way of example, the compounding of single-stage ratios of 160:1 and 159:1 results in a total reduction ratio of 12,720:1. Harmonic drives suitable for use in the present invention may be obtained from the Harmonic Drive Division of Quincy Technologies, Inc. in Wakefield, Mass.

Figure 7:
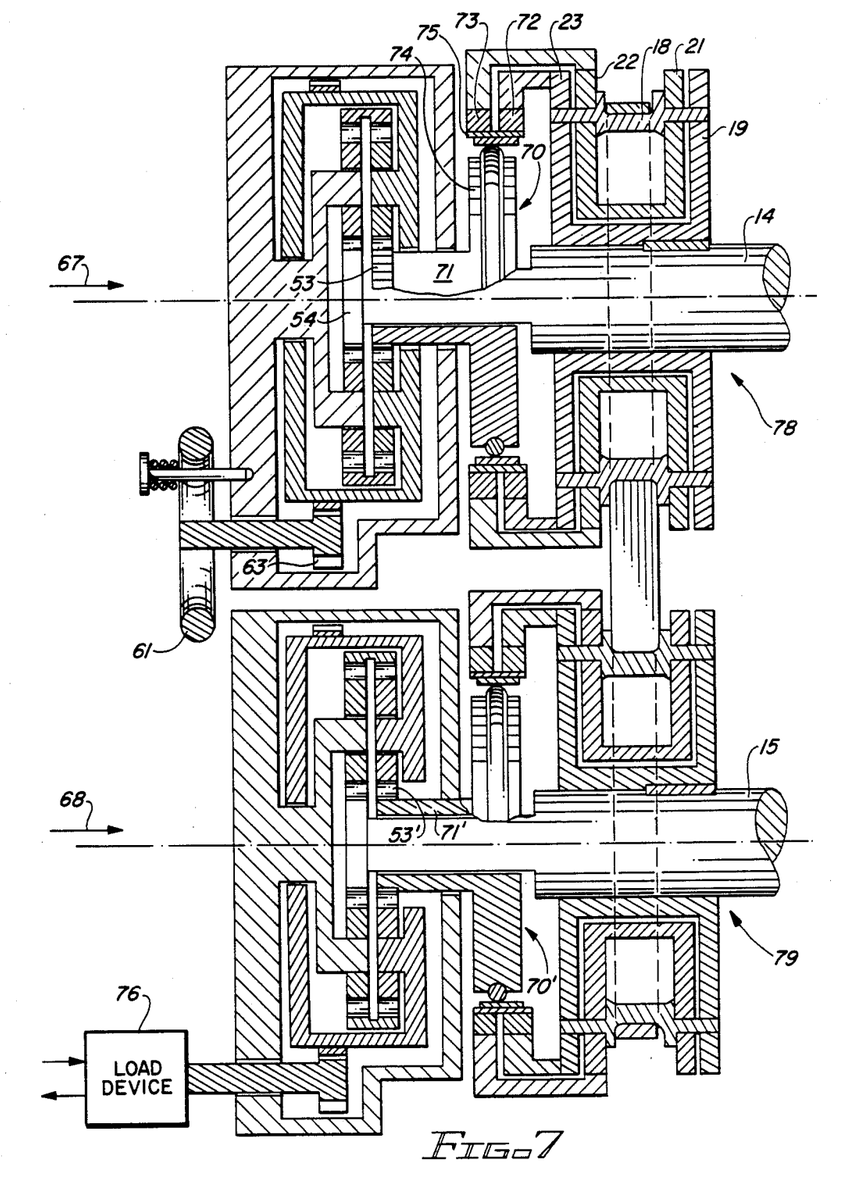
FIG. 7 is a simplified cross sectional view of a flat belt continuously variable transmission illustrating the fundamental aspects of the mechanical components of a variant of the subject control system, employing a harmonic drive, for establishing the angular relationship between the inner and outer guideway disks of each pulley.

Consider now, with reference to FIG. 7, the manner in which a harmonic drive can be advantageously incorporated into a CVT according to the present invention. A harmonic drive component 70 is interposed between the set of inner guideway disks 21, 22 (and the set of outer guideway disks 19, 23) of the driving pulley assembly 78 and the inner sun gear 53 via a hollow shaft 71. Similarly, another harmonic drive component 70' is interposed between the set of inner guideway disks 21', 22' (and the set of outer guideway disks 19', 23') of the driven pulley assembly 79 and the inner sun gear 53' via a hollow shaft 71'. The driving shaft 14 extend through the hollow shaft 71 and carries the outer sun gear 54 at its end while the driven shaft 15 extend through the hollow shaft 71' and carries the outer sun gear 54' at its end. The remaining structure of the planetary gear assembly is as described in conjunction with FIGS. 4 and 5.

Thus, the set of outer guideway disks 19, 23 are connected to the dynamic spline 72 of the harmonic drive 70, and the set of inner guideway disks 21, 22 are connected to the circular spline 73 of the harmonic drive. The wave generator 74 is directly connected to the hollow shaft 71 and is hence directly coupled to the inner sun gear 53. Under static conditions in which the speed ratio has been previously established and in which the speed control crank 61 is fixed in position, the sets of inner guideway disks 21, 22 and outer guideway disks 19, 23 are rotating at the same rate. Consequently, there is no relative movement between the dynamic spline 72 and circular spline 73 such that the wave generator 74, the hollow shaft 71 and inner sun gear 53 are all rotating at the same rate as the shaft 14 and the outer sun gear 54.

If it is now desired to change the speed ratio between the driving pulley assembly 78 and the driven pulley assembly 79, the speed control crank 61 may be released and turned as previously described. In the following analysis, it may again be assumed that the driving shaft 14 is stationary to best appreciate the transient movements among the several components of the control mechanism. If the speed control crank 61 is rotated in the clockwise direction, the planet carrier 51 rotates in the counter clockwise direction to also drive the inner sun gear 53 in the counter clockwise direction. Therefore, the hollow shaft 71 and the wave generator 74 rotate counter clockwise. This rotation is communicated through the flexspline 75 to both the dynamic spline 72 and the circular spline 73. However, since the shaft 14 is deemed to be stationary and the set of outer guideway disks 19, 23 are fixed to the shaft, the dynamic spline 72 is constrained against rotation. Therefore, for each full revolution of the wave generator 74, the circular spline 73 rotates two teeth in the clockwise direction to effect a precise translation of the belt engaging elements 18 radially inwardly to decrease the effective diameter of the driving pulley assembly 78. This will be recognized as a reversal of the effect achieved by turning the speed control crank 61 in the clockwise direction in the system illustrated in FIG. 4, a straightforward result of the mechanical reversal which takes place across the harmonic drive 70.

In response, the belt engaging elements 18' of the driven pulley assembly 79 will move radially outwardly, and energy will be delivered to the load device 76. However, because of the presence of the harmonic drives 70, 70' in the pulley assemblies 78, 79, the speed control crank 61 and load device 76 will rotate many more turns (equivalent to the gear ratio of the harmonic drive) during the transient speed ratio adjustment operation. Thus, the speed control torque and power required in the transient speed ratio adjustment operation are reduced by the gear ratio of the harmonic drive (not considering efficiency losses). Since the harmonic drive gear ratio is typically of the order of 100:1 or more, the reduction in the control torque and power are very large indeed.

Those skilled in the art will understand that the incorporation of the harmonic drives 70, 70' into the geared control system serves to greatly magnify the precision of control over the speed ratio between the pulley assemblies of a flat belt CVT. In addition, the torque requirement for the device driving the pinion 63 is accordingly reduced. This feature permits the use of, for example, a small reversible electrical motor as the device connected to the pinion 63 and this, in turn, permits the use of relatively simple external control structure such as that illustrated in FIG. 8 in an exemplary vehicular environment. Thus, normal engine speed and throttle position information may be analyzed by conventional logic 80 to determine if a change in speed ratio is desirable and, if so, to energize the reversible d-c motors 81, 82 to drive the mechanisms previously described in the appropriate directions until the sought ratio is obtained. In a practical installation, this is an ongoing process to obtain the desired engine torque-speed characteristic giving minimun fuel consumption and, as those skilled in the art will understand, other process variables (temperature, atmospheric pressure, "performance" setting, vehicle speed, etc.) are often taken into account in determining the desired instantaneous speed ratio.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:
1. In a continuously variable transmission including:
(A) first and second pulley assemblies, each said pulley assembly including:
  1. a shaft;
  2. a pair of pulley sheaves;
  3. a series of belt engaging elements, each said belt engaging element having:
    a. an elongated central shank including a drive surface adapted to be engaged by said drive belt;
    b. a first bearing region at a first end of said central shank; and
    c. a second bearing region at a second end of said central shank;
  4. each said pulley sheave including:
    a. a pair of relatively movable guideway disks lying alongside each other in juxtaposition;

i. an inner guideway disk of each said pair including a first series of guideways extending in one direction;

ii. an outer guideway disk of each said pair including a second series of guideways extending in a second direction;

iii. said first and second series of spiral guideways providing intersections for capturing and locating said bearing regions of said belt engaging elements, said intersections providing locations for said bearing regions to establish radial positions of said belt engaging elements with respect to said shaft;

5. means connecting said inner guideway disks of said pulley sheaves together to establish an inner guideway disk set which rotates about the axis of said shaft;

6. means connecting said outer guideway disks of said pulley sheaves together to establish an outer guideway disk set which rotates about the axis of said shaft;

7. means coupling at least one of said guideway disks to said shaft for rotation therewith; and 8. means for adjusting the angular relationship between said inner guideway disk set and said outer guideway disk set to establish the effective diameter of said pulley assembly; and (B) a flat drive belt coupling said first and second pulley assemblies;

the improvement in which said means for adjusting the angular relationship between said inner guideway disk set and said outer guideway disk set of at least one of said pulley assemblies comprises:

(C) a planetary gear system mechanically disposed intermediate said inner guideway disk set and said outer guideway disk set, said planetary gear system including:

1. a first sun gear coupled to said inner guideway disk set;

2. a second sun gear coupled to said outer guideway disk set;

3. said first and second sun gears being axially aligned;

4. a rotatable planet carrier;

5. a set of planet gears meshing with one of said first and second sun gears, said planet gears being supported on said planet carrier;

6. a set of star gears meshing with the other of said first and second sun gears, each of said star gears being supported in fixed angular position with respect to said other of said first and second sun gears;

7. an internal ring gear meshing with said planet gears and said star gears; and 8. means for selectively changing the angular relationship between said planet carrier and said star gears.

2. The continuously variable transmission of claim 1 in which said means for selectively changing the angular relationship between said planet carrier and said star gears further includes:

(A) an external ring gear carried by said planet carrier;
(B) a pinion meshing with said external ring gear; and
(C) means for selectively rotating said pinion.

3. The continuously variable transmission of claim 2 in which said means for selectively rotating said pinion includes a manually operable crank.

4. The continuously variable transmission of claim 2 in which said means for selectively rotating said pinion includes a reversible electric motor-generator.

5. The continuously variable transmission of claim 2 in which said means for selectively rotating said pinion includes a reversible hydraulic motor-pump unit.

6. The continuously variable transmission of claim 1 in which said improvement further includes a differential gear system mechanically disposed intermediate one of said sun gears and the one of said guideway disk sets to which said one sun gear is coupled, said differential gear system being configured to obtain a smaller degree of change to the angular relationship between said inner and outer disk sets than the change in angular relationship between said sun gears obtained by operating said means for selectively changing the angular relationship between said planet carrier and said star gears.

7. The continuously variable transmission of claim 6 in which said means for selectively changing the angular relationship between said plantet carrier and said star gears further includes:

(A) an external ring gear carried by said planet carrier;
(B) a pinion meshing with said external ring gear; and
(C) means for selectively rotating said pinion.

8. The continuously variable transmission of claim 7 in which said means for selectively rotating said pinion includes a manually operable crank.

9. The continuously variable transmission of claim 7 in which said means for selectively rotating said pinion includes a reversible electric motor-generator unit.

10. The continuously variable transmission of claim 7 in which said means for selectively rotating said pinion includes a reversible hydraulic motor-pump unit.

11. The continuously variable transmission of claim 6 in which said differential gear system comprises a harmonic drive.

12. The continuously variable transmission of claim 11 in which said means for selectively changing the angular relationship between said planet carrier and said star gears further includes:

(A) an external ring gear carried by said planet carrier;
(B) a pinion meshing with said external ring gear; and
(C) means for selectively rotating said pinion.

13. The continuously variable transmission of claim 12 in which said means for selectively rotating said pinion includes a manually operable crank.

14. The continuously variable transmission of claim 12 in which said means for selectively rotating said pinion includes a reversible electric motor-generator unit.

15. The continuously variable transmission of claim 12 in which said means for selectively rotating said pinion includes a reversible hydraulic motor-pump unit.

* * * * *